UNITED STATES PATENT OFFICE 2,606,176

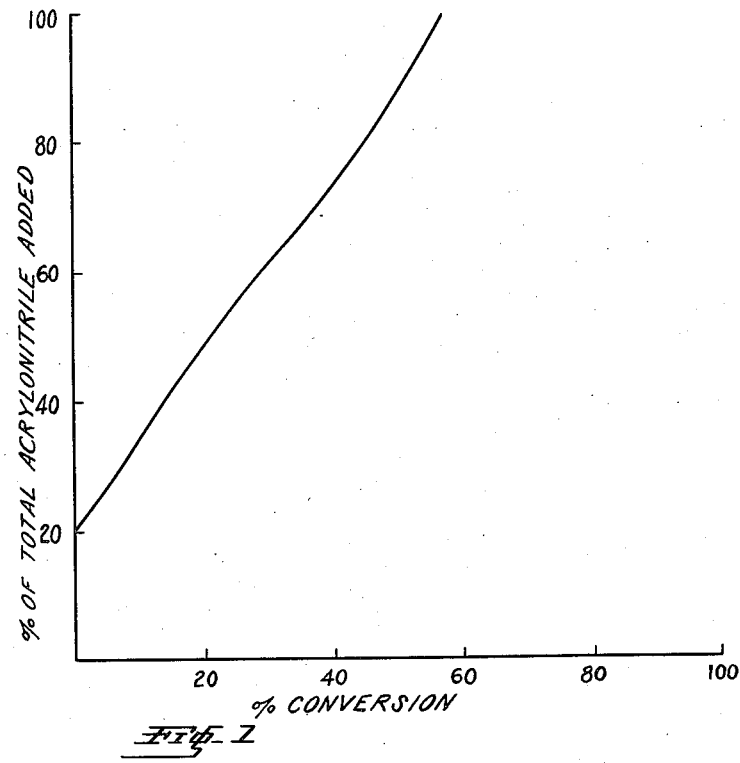
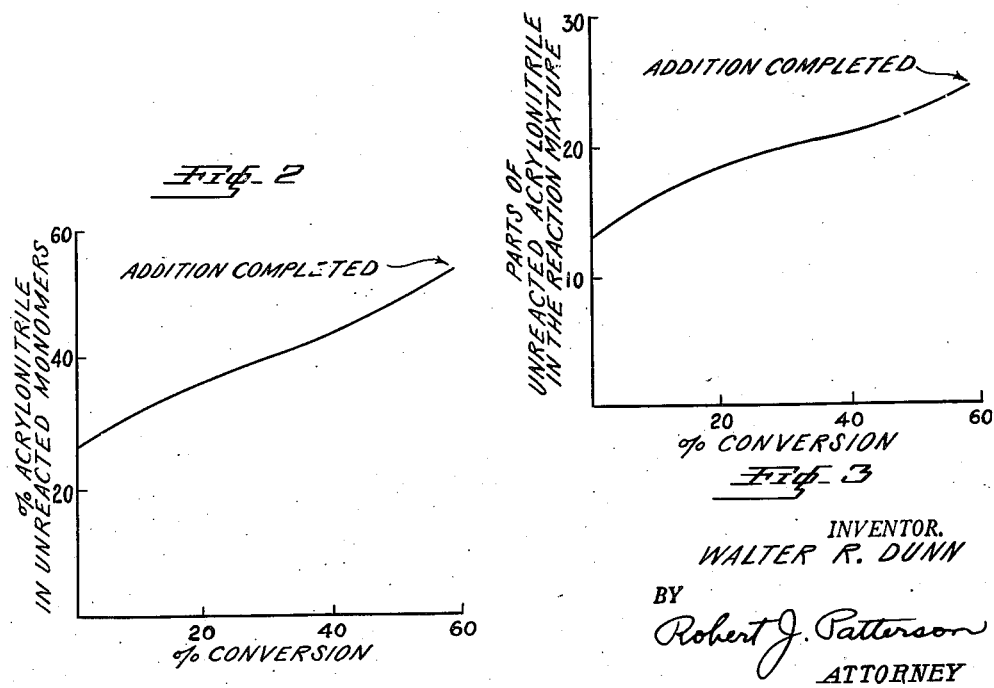

ACRYLONITRILE-ISOBUTYLENE COPOLYMERS AND PROCESS OF MAKING SAME

Walter R. Dunn, Teaneck, N. J., assignor to United States Rubber Company, New York, N. Y., a corporation of New Jersey Application September 17, 1947, Serial No. 774,629

4 Claims. (Cl. 260—85.5)

This invention relates to a novel process for producing improved emulsion interpolymers of acrylonitrile and isobutylene. More particularly, this invention relates to a process for making readily fusible interpolymers of acrylonitrile and isobutylene of improved properties and containing about 70% combined acrylonitrile, by controlled addition of acrylonitrile to the polymerizable mix in a certain manner during the course of the polymerization. The invention also relates to improved acrylonitrile-isobutylene copolymers.

In the usual process of copolymerizing acrylonitrile with isobutylene in aqueous emulsion, the entire charge of acrylonitrile to be polymerized is mixed with the isobutylene, polymerization catalyst, emulsifying agent, water and other ingredients at the start of the process. Although the copolymerization may be carried out at room temperature, heat is usually applied to increase the rate of reaction. It is observed that during the first few hours of heating little or no polymer is formed. After this "induction period" appreciable formation of polymer begins. Due to the relatively high reactivity of acrylonitrile, the product formed at the beginning of the reaction is relatively high in combined acrylonitrile, and accordingly, as the copolymerization proceeds, the ratio of monomeric acrylonitrile to monomeric isobutylene in the reaction mixture decreases and the composition of the copolymer being formed changes progressively. The non-uniform copolymer has undesirable characteristics, notably, a high flow temperature and a low flow temperature coefficient, which make the production of molded articles in standard commercial equipment inconvenient. For example, the copolymer produced in this manner from a reaction mixture containing initially acrylonitrile and isobutylene in mole ratio of 2:1 has a flow temperature of about 157° C. and requires a relatively long molding cycle and a high molding temperature. Further, this high flow temperature is disadvantageous when the copolymer is employed for other uses, as when it is used in the form of an aqueous emulsion for stiffening or improving textile fabrics where it is necessary to flux the resin or bind it to the fabric by ironing or heating the treated fabric at a temperature sufficiently high to soften the resin so as to obtain a maximum of stiffness or improvement in the fabric which is not removed by laundering or dry cleaning.

According to the present invention readily fusible interpolymers of acrylonitrile and isobutylene having a low flow temperature, viz., from 100° to 125° C., and good physical properties and containing from 65 to 75%, and preferably about 70%, of combined acrylonitrile can be obtained in good yield by adding the acrylonitrile gradually to the reaction mixture, in a manner to be described, during the course of the reaction.

My invention resides in a process of making readily fusible resinous acrylonitrile-isobutylene copolymers of uniform composition and having a low flow temperature, i. e. of from 100 to 125° C., by subjecting an aqueous emulsion comprising the isobutylene, that is substantially the total amount of isobutylene to be employed, an emulsifying agent, and a polymerization catalyst to conditions such as to effect copolymerization of isobutylene with acrylonitrile, incorporating acrylonitrile with the polymerization mixture in such a manner that when polymerization is initiated, i. e., at the end of the induction period, at least 5 but not over 35% of the total amount of acrylonitrile to be added has been added, and thereafter while maintaining such conditions as to effect copolymerization of isobutylene with acrylonitrile adding the balance of the acrylonitrile gradually (either intermittently or continuously) at such a rate that the addition of the acrylonitrile is completed at a point when the conversion has attained at least 50% but has not exceeded 85%.

My invention also resides in an improved resinous acrylonitrile-isobutylene copolymer of uniform composition made by the process herein disclosed. My new product is characterized by containing from 65 to 75% of combined acrylonitrile and correspondingly from 35 to 25% of combined isobutylene, by a flow temperature of from 100° to 125° C. and by its uniformity of composition. This uniformity of composition results from the fact that the copolymer made by my process has a substantially unvarying composition from the early stage of the polymerization to the completion thereof, i. e., the combined acrylonitrile content of the product at low conversion is substantially the same (viz., within 3% and usually within 1%) as that at high conversion, as shown by analysis of samples taken at different times during the reaction. In contrast to this, the conventional acrylonitrile-isobutylene copolymers of the prior art are blends of copolymers of widely varying acrylonitrile content, that is, they have a broad composition distribution resulting from the fact that the average combined acrylonitrile content of the copolymer at low conversion is higher, by a difference of 13% or more, than the average combined acrylonitrile content of the copolymer at high conversion.

The preferred product of my invention is characterized by containing from 69 to 72% of combined acrylonitrile and correspondingly from 31 to 28% of combined isobutylene, by a flow temperature of from 100° to 115° C. and by the fact that all fractions or portions thereof have a combined acrylonitrile within the limits of 69 and 72%.

The monomeric materials used in the practice of my invention almost invariably consist essentially of acrylonitrile and isobutylene and usually consist exclusively of these two monomers.

In general, in carrying out the process of this invention a mixture of water and any suitable emulsifying agent, polymerization catalyst and, if desired, polymerization regulator, is placed in a pressure vessel equipped with suitable agitating and heating means, a proportioning pump or other means for delivering acrylonitrile to the reaction mixture, and an opening for withdrawing samples periodically. The total charge of isobutylene is introduced as a liquid under pressure, and agitation and heating are begun. At the start of the heating, or when the mixture has attained reaction temperature, preferably from 30° to 75° C., the addition of acrylonitrile is begun at such a rate that at the end of the induction period (i. e. when polymerization is initiated) from 5 to 35% of the acrylonitrile has been added. Thereafter, as the copolymerization proceeds, the addition of acrylonitrile is continued, either continuously or portionwise, at such a rate that the total amount of acrylonitrile shall have been added when a conversion of 50 to 85% is attained (conversions are herein expressed as percentages based on the total weight of monomers employed in the entire process).

In applying this addition schedule, the total quantity of acrylonitrile to be employed is determined according to the combined acrylonitrile content desired in the final product. It is preferred to employ an over-all charge of about 2 moles, i. e. from 1.7 to 2.3, of acrylonitrile for each mole of isobutylene in order to obtain a product containing about 70%, i. e. 69 to 72%, of combined acrylonitrile. Smaller quantities of acrylonitrile may be employed—for instance, 1.5 moles of acrylonitrile per mole of isobutylene—to obtain a copolymer containing about 65 to 68% of acrylonitrile; or larger quantities may be employed—for instance, 3 moles of acrylonitrile per mole of isobutylene—to obtain a copolymer containing about 75% of combined acrylonitrile.

In the preferred form of the invention, an over-all charge of approximately two moles, i. e. from 1.7 to 2.3 moles, of acrylonitrile (per mole of isobutylene) is added at such a rate that at the end of the induction period from 15 to 25% of the total charge of acrylonitrile has been added, and the remainder of the acrylonitrile is added at such a rate that the total amount of acrylonitrile has been added when a conversion of 55 to 70% has been reached. In such case the conversion must reach at least 55% by the time all of the acrylonitrile is added. A typical addition schedule of this type is represented graphically in three different ways in Figures 1, 2 and 3, which are explained in connection with the example below.

With this preferred addition schedule copolymers of uniform composition containing 69 to 72% of combined acrylonitrile are obtained which are readily fusible and have flow temperatures in the range 100° to 115° C. Further, with the preferred rate of acrylonitrile addition, good yields of uniform copolymer are obtained in a relatively short reaction time. For instance, a conversion of 77% may be obtained in 23 hours reaction time at 65° C.

While somewhat slower rates of addition than this rate may be employed, it will be found that with slower rates of addition a longer reaction time is required to attain a given conversion since the rate of copolymerization of acrylonitrile and isobutylene is proportional to the concentration of acrylonitrile in the reaction mixture.

For the purpose of obtaining a readily fusible copolymer of acrylonitrile and isobutylene of uniform composition and good physical properties, I have found it necessary to add the acrylonitrile at least rapidly enough so that all of the acrylonitrile has been added before a conversion of about 85% is attained. The conversion must, however, reach at least 50% by the time all of the acrylonitrile has been added.

The quantity of acrylonitrile required to be present at the end of the induction period, i. e., 5 to 35% of the total acrylonitrile employed, may be added all at once at the start of the process or continuously or in portions throughout the induction period, which is usually about 3 hours at a reaction temperature of 65° C. The remainder of the acrylonitrile may be added continuously or in several portions. For instance, if 35% of the acrylonitrile has been added by the end of the induction period, an additional 25% may be added when a conversion of 15% is attained, an additional 25% may be added when a conversion of 40% is attained and the final 15% may be added when a conversion of 60% is attained.

The rate of addition of acrylonitrile is preferably at least sufficiently uniform so that not more than 35% of the total quantity of acrylonitrile is added over the course of any 20% increment of conversion, and not less than 27% of the total quantity is added over the course of any 30% increment of conversion.

The copolymerization is usually stopped by discontinuing the heating when a conversion of 50 to 85% is attained, usually in from 16 to 60 hours reaction time at 30° to 75° C. The reaction mixture is cooled, the unreacted isobutylene is vented off, and the unreacted acrylonitrile may be removed by steam distillation. The latex may be flocculated with brine and the polymer filtered off, washed and dried. For some uses, such as treating textiles, the latex itself may be employed. The acrylonitrile-isobutylene copolymer so produced has a uniform composition, unlike the acrylonitrile-isobutylene copolymer formed by known polymerization processes, and the products have more desirable physical properties. For instance, molding powders or textile treating resins having flow temperatures in the desirable range to 100 to 125° C. can be readily produced. Thus, a typical batch of copolymer produced from an overall molar ratio of acrylonitrile to isobutylene of 2:1 by the method of the present invention had a flow temperature of 105° C., while the acrylonitrile-isobutylene copolymer resulting from the same ratio of reactants with all of the acrylonitrile added at the start of the reaction had a flow temperature of 157° C. The flow temperature is defined as the temperature at which a ⅜-inch molded pellet will extrude through a ⅛-inch orifice at the rate of 1 inch in 2 minutes under an applied load of 1500 p. s. i. (ASTM, D 569-44 T).

In addition to having a low flow temperature, the uniform copolymer of this invention has a high flow temperature coefficient. The flow temperature coefficient is defined as the reciprocal of the rate of flow of the copolymer at a temperature 10° below the flow temperature, the rate of flow being expressed as the inches of flow per 2-minute interval determined under the conditions described above. The flow temperature coefficient is a measure of the increase in fluidity of the copolymer with increasing temperature, or in other words, a measure of the sharpness with which the material melts. The practical advantage of the high flow temperature coefficient is that articles can be molded more quickly, particularly by injection molding, since the material flows quickly and readily into the mold and sets or hardens as soon as it cools slightly so that the articles may be quickly ejected from the mold. With materials of low flow temperature coefficient it is necessary to allow the molded articles to cool in the mold for a relatively long time before it can safely be removed without deformation. This greatly decreases the capacity of given molding equipment.

While the combined acrylonitrile content of the conventional copolymer varied from 88% at low conversion to 75% at high conversion, the copolymer made by the method of this invention did not vary more than 1 to 3% in acrylonitrile content from low to high conversion.

While it is possible to obtain a low flow temperature acrylonitrile-isobutylene copolymer by ordinary emulsion polymerization processes by utilizing a relatively small proportion of acrylonitrile—for instance, ⅓ mole of acrylonitrile per mole of isobutylene—added entirely at the start of the reaction, such a process gives only a low yield of non-uniform product of poorer physical properties. The following table shows a comparison of non-uniform copolymer of low flow temperature prepared by such a method with uniform copolymer of the same flow temperature prepared by the process of the present invention.

|  | Conventional Low Acrylonitrile Method | Controlled Monomer Addition Method |
|---|---|---|
| Flow temperature (° C.) | 105 | 105 |
| Flow temperature coefficient | 1.9 | 2.3 |
| Reaction time (hours at 60° C.) | 21 | 21 |
| Conversion of monomer to polymer (percent) | 45 | 65 |
| Tensile strength (p. s. i.) | 4,800 | 7,080 |
| Flexural strength (p. s. i.) | 10,200 | 15,100 |
| Impact strength (ft.-lbs. per 1″ x ½″ cross-sectional area) | 2.0 | 5.8 |
| Rockwell hardness | M-74 | M-83 |

The intrinsic viscosity of the product obtained by controlled addition of acrylonitrile by my method is generally from 0.6 to 2, in dimethyl formamide.

As polymerization catalyst, the inorganic peroxides, such as hydrogen peroxide, persalts, e. g., alkali-metal or ammonium peroxysulfates or peroxycarbonates, or mixtures thereof, are preferred, although organic peroxides such as acetyl peroxide, benzoyl peroxide or other known polymerization catalysts such as diazo thioethers, combined oxidizing and reducing agents such as potassium persulfate and sodium bisulfite, etc., may be used. About 0.5 part of catalyst per 100 parts of total monomers used in the process will generally be found to be suitable, although smaller or larger amounts such as 0.3 to 2 parts may be used. Instead of adding all of the catalyst at the start of the reaction, the catalyst may be added in portions as the reaction proceeds. For instance, half of the catalyst may be added at the start of the process, and the balance added at a conversion of about 40–50%, or smaller portions may be added more frequently.

The polymerization may be carried out in the presence or absence of a polymerization regulator such as dodecyl mercaptan which acts to control the length of the polymer chain. The regulator may be added at the start of the reaction, or as the polymerization proceeds.

The emulsifying agent may be any conventional type of surface-active agent used in the aqueous emulsion polymerization of monomeric unsaturated materials to make synthetic resins and rubbers, such as alkali salts of fatty acids containing more than 8 carbon atoms (i. e., soaps), sulfates or sulfonates of organic compounds containing at least one group having more than 8 carbon atoms, e. g., alkyl sulfates or sulfonates, sulfated or sulfonated ethers of long and short chain fatty acids, or cationic dispersing agents such as dodecyl amine hydrochloride etc. Condensation products of an aryl sulfonic acid with formaldehyde, or other emulsifying agents, may also be used.

The proportion of total monomers charged in the process to the weight of the reaction mixture conveniently ranges from 20 to 50%.

The method of this invention may be readily applied to a continuous process. For example, the isobutylene and other ingredients may be introduced into one end of an elongated reaction zone with a portion of the acrylonitrile. As the reaction mixture moves along the reaction zone, further quantities of acrylonitrile may be introduced at selected points so that the required monomer content is present along the path of travel of the reaction mixture. The copolymer latex may be continuously withdrawn from the outlet end of the reaction zone and processed either continuously or batchwise.

The products of this invention are suited to a variety of uses, including fabrication of molded articles, fibers, films and sheets. For certain uses, such as impregnating or coating of textiles and other articles, the copolymer latex or solution may be used. The copolymer may be used alone, or in conjunction with other resins, plasticizers, fillers and other modifying ingredients.

The following example illustrates the invention. Parts are by weight.

*Example*

A stainless steel autoclave equipped with an agitator, a heating jacket, an opening for withdrawing samples, and a proportioning pump for charging acrylonitrile, was flushed with nitrogen, evacuated, and the following ingredients were charged:

| | Parts |
|---|---|
| Water | 300 |
| Isobutylene | 35 |
| Dodecyl mercaptan | 1.0 |
| Potassium peroxydisulfate | 0.5 |
| Diamyl sodium sulfosuccinate | 3.0 |
| Acrylonitrile (added continuously) | 65 |

For convenience in charging, the diamyl sodium sulfosuccinate dispersing agent and dodecyl mercaptan polymerization regulator were mixed with about 100 parts of the water before charging. The potassium peroxydisulfate polymerization catalyst was dissolved in about 80 parts of the water before charging. All of the isobutylene was run in at the start as a liquid, under pressure.

The agitator was started and the reactor contents were heated up to 65° C. The addition of acrylonitrile by means of the proportioning pump was then started at a rate of 4.33 parts per hour. Samples of the reaction mixture were withdrawn at intervals, and the conversion of monomers to copolymer was determined from the solids content of the sample. About three hours after the addition of acrylonitrile was started, appreciable quantities of polymer began to appear. At this point about 20% of the total quantity of acrylonirile had been added and the concentration of unreacted acrylonitrile present was about 27% by weight of the total unreacted monomers present. The addition schedule employed is represented graphically in Fig. 1. The addition of acrylonitrile was continued at the rate of 4.33 parts per hour and the proportion of unreacted acrylonitrile in the unreacted monomers increased uniformly with conversion as illustrated in Figure 2. When a conversion of about 57% of the total monomers was reached the entire quantity of acrylonitrile had been added. The increase in the quantity of free acrylonitrile in the reaction mixture is shown graphically in Figure 3 in terms of parts of free acrylonitrile present at any conversion. Heating was continued until a conversion of about 69% was attained. The total time of heating at 65° C. was about 23 hours. The reaction mixture was then cooled, the unreacted isobutylene was vented off, and the unreacted acrylonitrile was removed by vacuum steam distillation. The polymer latex was flocculated with an equal volume of 10% brine, filtered, washed with water, and dried in air. The copolymer had a substantially uniform composition as indicated by nitrogen contents of 19.0, 18.8 and 19.0% at conversions of 30, 50 and 60%. The corresponding flow temperatures of the copolymer were 111, 108, and 109° C., respectively. The combined acrylonitrile content of the copolymer was 72%. The intrinsic viscosity was 0.76 in dimethyl formamide.

All percentages given herein are by weight.

Having thus described my invention, what I claim and desire to protect by Letters Patent is:

1. The process of making a readily fusible resinous acrylonitrile-isobutylene copolymer of uniform composition and having a flow temperature of from 100 to 125° C. and consisting of from 65 to 75% of combined acrylonitrile and correspondingly from 35 to 25% of combined isobutylene, which comprises heating an aqueous emulsion comprising the total amount of isobutylene employed, an emulsifying agent, and a polymerization catalyst at an elevated temperature of from 30° to 75° C. while agitating said emulsion, continuously introducing acrylonitrile at a constant rate into said emulsion in such a way that the proportion of unreacted acrylonitrile relative to unreacted isobutylene in the emulsion increases uniformly with conversion until said introduction of acrylonitrile is complete, and said introduction of acrylonitrile being so scheduled that at the end of the induction period from 5 to 35% of the total amount of acrylonitrile has been added and so that the total amount of acrylonitrile has been added when a conversion of from 50 to 85% has been attained, heating the emulsion at said temperature and agitating it throughout the polymerization, the overall charge of monomeric material consisting of acrylonitrile and isobutylene in proportions of from 1.5 to 3 moles of acrylonitrile per mole of isobutylene, and recovering from the resulting reaction mixture the entire copolymer product thereof, said copolymer product having the above characteristics and the higher proportions of charged acrylonitrile within the aforesaid range resulting in correspondingly higher proportions of combined acrylonitrile in the product, and every increment thereof being substantially identical in chemical and physical properties with every other increment thereof.

2. The process of making a readily fusible resinous acrylonitrile-isobutylene copolymer of uniform composition and having a flow temperature of from 100 to 115° C. and consisting of from 69 to 72% of combined acrylonitrile and correspondingly from 31 to 28% of combined isobutylene, which comprises heating an aqueous emulsion comprising the total amount of isobutylene employed, an emulsifying agent, and a polymerization catalyst at an elevated temperature of from 30° to 75° C. while agitating said emulsion, continuously introducing acrylonitrile at a constant rate into said emulsion in such a way that the proportion of unreacted acrylonitrile relative to unreacted isobutylene in the emulsion increases uniformly with conversion until said introduction of acrylonitrile is complete, and said introduction of acrylonitrile being so scheduled that at the end of the induction period from 15 to 25% of the total amount of acrylonitrile has been added and so that the total amount of acrylonitrile has been added when a conversion of from 55 to 70% has been attained, heating the emulsion at said temperature and agitating it throughout the polymerization, the overall charge of monomeric material consisting of acrylonitrile and isobutylene in proportions of from 1.7 to 2.3 moles of acrylonitrile per mole of isobutylene, and recovering from the resulting reaction mixture the entire copolymer product thereof, said copolymer product having the above characteristics and the higher proportions of charged acrylonitrile within the aforesaid range resulting in correspondingly higher proportions of combined acrylonitrile in the product, and every increment thereof being substantially identical in chemical and physical properties with every other increment thereof.

3. A process of making a readily fusible resinous acrylonitrile-isobutylene copolymer of uniform composition and having a flow temperature of from 100 to 125° C. which comprises heating an aqueous emulsion comprising the total amount of isobutylene to be employed, an emulsifying agent, and a polymerization catalyst, at an elevated temperature of from 30° to 75° C., at which temperature copolymerization of isobutylene with acrylonitrile occurs, adding acrylonitrile to the polymerization mixture at such a rate that the proportion of unreacted acrylonitrile relative to unreacted isobutylene in the said emulsion increases continually with advancing conversion of the said monomers to the copolymeric state, the said rate of addition of acrylonitrile being so scheduled that at the end of the induction period from 5 to 35% of the total amount of acrylonitrile to be added has been added, and thereafter while maintaining said conditions adding the balance of the acrylonitrile gradually at such a rate that the total amount of acrylonitrile has been added when a conversion of from 50 to 85% has been attained, and the rate of addition being such that not more than 35% of the total quantity of acrylonitrile is added over the course of any 20% increment of conversion taking place during the addition thereof, and not less than 27% of the total quantity of acrylonitrile is added over the course of any 30% increment of conversion taking place during the addition, the overall charge of monomeric material consisting of acrylonitrile and isobutylene in proportions of from 1.5 to 3 moles of acrylonitrile per mole of isobutylene, the higher proportions of charged acrylonitrile within the aforesaid range resulting in correspondingly higher proportions of combined acrylonitrile in the product, and recovering from the reaction mixture the resulting copolymer product, said copolymer product having the above characteristics, and every increment of the said copolymer having substantially the same chemical and physical properties as every other increment thereof.

4. A process of making a readily fusible resinous acrylonitrile-isobutylene copolymer of uniform composition and having a flow temperature of from 100 to 115° C., which comprises heating an aqueous emulsion comprising the total amount of isobutylene to be employed, an emulsifying agent, and a polymerization catalyst, at an elevated temperature of from 30° to 75° C., at which temperature copolymerization of isobutylene with acrylonitrile occurs, incorporating acrylonitrile with the polymerization mixture at such a rate that the proportion of unreacted acrylonitrile relative to unreacted isobutylene in the said emulsion increases continually with advancing conversion of the said monomers to the copolymer state, the said rate of addition of acrylonitrile being so scheduled that at the end of the induction period from 15 to 25% of the total amount of acrylonitrile to be added has been added, and thereafter while maintaining said conditions adding the balance of the acrylonitrile gradually at such a rate that the total amount of acrylonitrile has been added when a conversion of from 55 to 70% has been obtained, and in such a manner that not more than 35% of the total quantity of acrylonitrile is added over the course of any 20% increment of conversion taking place during the addition thereof and not less than 27% of the total quantity of acrylonitrile is added over the course of any 30% increment of conversion taking place during the addition, the overall charge of monomeric material consisting of acrylonitrile and isobutylene in proportions of from 1.7 to 2.3 moles of acrylonitrile per mole of isobutylene, the higher proportions of charged acrylonitrile within the aforesaid range resulting in correspondingly higher proportions of combined acrylonitrile in the product, and recovering from the reaction mixture the resulting copolymer product, said copolymer product having the above characteristics, and every increment of the said copolymer having substantially the same chemical and physical properties as every other increment thereof.

WALTER R. DUNN.

REFERENCES CITED

The following references are of record in the file of this patent:

UNITED STATES PATENTS

| Number | Name | Date |
|---|---|---|
| 2,100,900 | Fikentscher et al. | Nov. 30, 1937 |
| 2,417,607 | Mowry | Mar. 18, 1943 |
| 2,420,330 | Schriber et al. | May 13, 1947 |
| 2,462,354 | Brubaker et al. | Feb. 22, 1949 |
| 2,486,241 | Arnold | Oct. 25, 1949 |
| 2,496,384 | De Nie | Feb. 7, 1950 |
| 2,531,196 | Brubaker | Nov. 21, 1950 |
| 2,537,146 | Lytton | Jan. 9, 1951 |
| 2,537,626 | Eberly | Jan. 9, 1951 |

FOREIGN PATENTS

| Number | Country | Date |
|---|---|---|
| 573,086 | Great Britain | Nov. 6, 1945 |